(12) United States Patent
Sharma et al.

(10) Patent No.: US 11,134,077 B2
(45) Date of Patent: Sep. 28, 2021

(54) USER-CONTROLLED TRANSACTION ANNOTATION FOR AUTHENTICATION EVENTS ACROSS MULTIPLE USER DEVICES

(71) Applicant: EMC IP Holding Company LLC, Hopkinton, MA (US)

(72) Inventors: Nagendra Gudibande Srikanta Sharma, Bangalore (IN); Udayendranaidu Gottapu, Visakhapatnam (IN); Pedda Peddy Kathriki, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 16/174,627

(22) Filed: Oct. 30, 2018

(65) Prior Publication Data
US 2020/0137046 A1 Apr. 30, 2020

(51) Int. Cl.
*H04L 29/06* (2006.01)

(52) U.S. Cl.
CPC ........ *H04L 63/0853* (2013.01); *H04L 63/083* (2013.01); *H04L 63/0861* (2013.01)

(58) Field of Classification Search
CPC ............... H04L 63/0853; H04L 63/083; H04L 63/0861; H04L 9/08; H04L 63/0428
See application file for complete search history.

(56) References Cited

U.S. PATENT DOCUMENTS

| | | | |
|---|---|---|---|
| 8,484,698 B2* | 7/2013 | Pemmaraju | H04L 63/0861 726/2 |
| 8,549,319 B2* | 10/2013 | Menczel | G06K 9/00885 713/186 |
| 9,704,153 B2 | 7/2017 | Roux et al. | |
| 9,807,069 B2 | 10/2017 | Maher et al. | |
| 10,169,937 B1* | 1/2019 | Zwink | G07C 9/257 |
| 10,341,113 B2* | 7/2019 | Starner | H04L 63/0861 |
| 2008/0098464 A1* | 4/2008 | Mizrah | G06F 21/36 726/5 |

(Continued)

*Primary Examiner* — Maung T Lwin
*Assistant Examiner* — Sanchit K Sarker
(74) *Attorney, Agent, or Firm* — Ryan, Mason & Lewis, LLP

(57) ABSTRACT

Methods, apparatus, and processor-readable storage media for user-controlled transaction tagging to enable easier identification and co-relation of subsequent related events are provided herein. An example computer-implemented method includes receiving, via a first user device in connection with a request to access a protected resource, a first set of user-generated cryptographic information and a second set of user-generated cryptographic information; generating and outputting an authentication request to a second user device in response to processing the first set of user-generated cryptographic information against a stored set of cryptographic information associated with the protected resource, wherein the authentication request causes the second set of user-generated cryptographic information to be rendered via the second user device; and resolving the authentication request in response to receiving, via the second user device, an indication to grant or deny the request to access the protected resource via the first user device.

20 Claims, 5 Drawing Sheets

(56) References Cited

U.S. PATENT DOCUMENTS

| | | | |
|---|---|---|---|
| 2009/0228703 A1* | 9/2009 | Grajek | H04L 9/3268 |
| | | | 713/156 |
| 2012/0013438 A1* | 1/2012 | Black | G06F 21/6209 |
| | | | 340/5.83 |
| 2016/0048667 A1* | 2/2016 | Kao | G06F 21/62 |
| | | | 726/19 |
| 2016/0127383 A1* | 5/2016 | Childs | G06F 3/0484 |
| | | | 726/30 |
| 2017/0149774 A1* | 5/2017 | Blinn | H04L 63/0428 |
| 2017/0244703 A1* | 8/2017 | Lee | H04W 12/065 |
| 2018/0014189 A1* | 1/2018 | Ellison | G10L 17/22 |
| 2018/0046785 A1* | 2/2018 | Anderson | G06F 21/31 |
| 2018/0063113 A1 | 3/2018 | Maher et al. | |
| 2018/0089407 A1* | 3/2018 | Watson | G10L 17/24 |
| 2018/0343564 A1* | 11/2018 | Henshaw | H04W 12/06 |
| 2019/0253324 A1* | 8/2019 | Kapinos | H04L 63/0861 |
| 2019/0305955 A1* | 10/2019 | Verma | H04L 63/18 |
| 2020/0137046 A1* | 4/2020 | Sharma | H04L 63/0853 |

\* cited by examiner

USER-CONTROLLED TRANSACTION ANNOTATION FOR AUTHENTICATION EVENTS ACROSS MULTIPLE USER DEVICES

FIELD

The field relates generally to information processing systems, and more particularly to techniques for providing security in such systems.

BACKGROUND

In order to gain access to applications or other resources via a computer or another user device, users are often required to authenticate themselves by entering authentication information. Such authentication information may include, for example, passwords, responses to one or more challenge questions, or other forms of cryptographic or authentication information (including one-time passwords (OTPs), biometric mechanisms, etc.).

In one example scenario, a user may request access to a protected resource from a first device and be prompted to authenticate on a second device. However, such processes can be vulnerable to attack from malicious actors. For instance, a malicious user may know (or accurately anticipate) the time of the day during which User A typically connects to a protected resource, and accordingly initiate a request to access the protected resource at that time using User A's username. Consequently, User A will receive, at approximately the same time, two authentication prompts containing nearly identical information. Accordingly, User A may not be able to differentiate User A's own authentication prompt from the authentication prompt generated via the malicious actor (or, User A may not be able to determine whether the authentication provider perhaps sent two separate authentication requests due to a legitimate technical and/or connectivity issue). Such uncertainty and/or confusion can plausibly lead to the malicious actor gaining access to the protected resource.

SUMMARY

Illustrative embodiments of the invention provide techniques for user-controlled transaction tagging to enable easier identification and co-relation of subsequent related events. An exemplary computer-implemented method can include receiving, via a first user device in connection with a request to access a protected resource associated with the user, a first set of user-generated cryptographic information and a second set of user-generated cryptographic information. Such a method also includes generating and outputting an authentication request to a second user device in response to processing the first set of user-generated cryptographic information against a stored set of cryptographic information associated with the protected resource (associated with the user), wherein the authentication request causes the second set of user-generated cryptographic information to be rendered via the second user device. Further, such a method additionally includes resolving the authentication request in response to receiving, via the second user device, an indication to grant or deny the request to access the protected resource via the first user device.

Illustrative embodiments can provide significant advantages relative to conventional multi-device authentication techniques. For example, challenges associated with uncertainty arising from multiple temporally-similar authentication prompts are overcome through the use of a user-generated set of cryptographic information that is included with the authentication request as a tag and/or annotation specific to the request and known (potentially only) to the user. Such a user-annotation mechanism can effectively and securely facilitate the identification and co-relation of subsequent associated events such as mobile push notifications for authentications.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
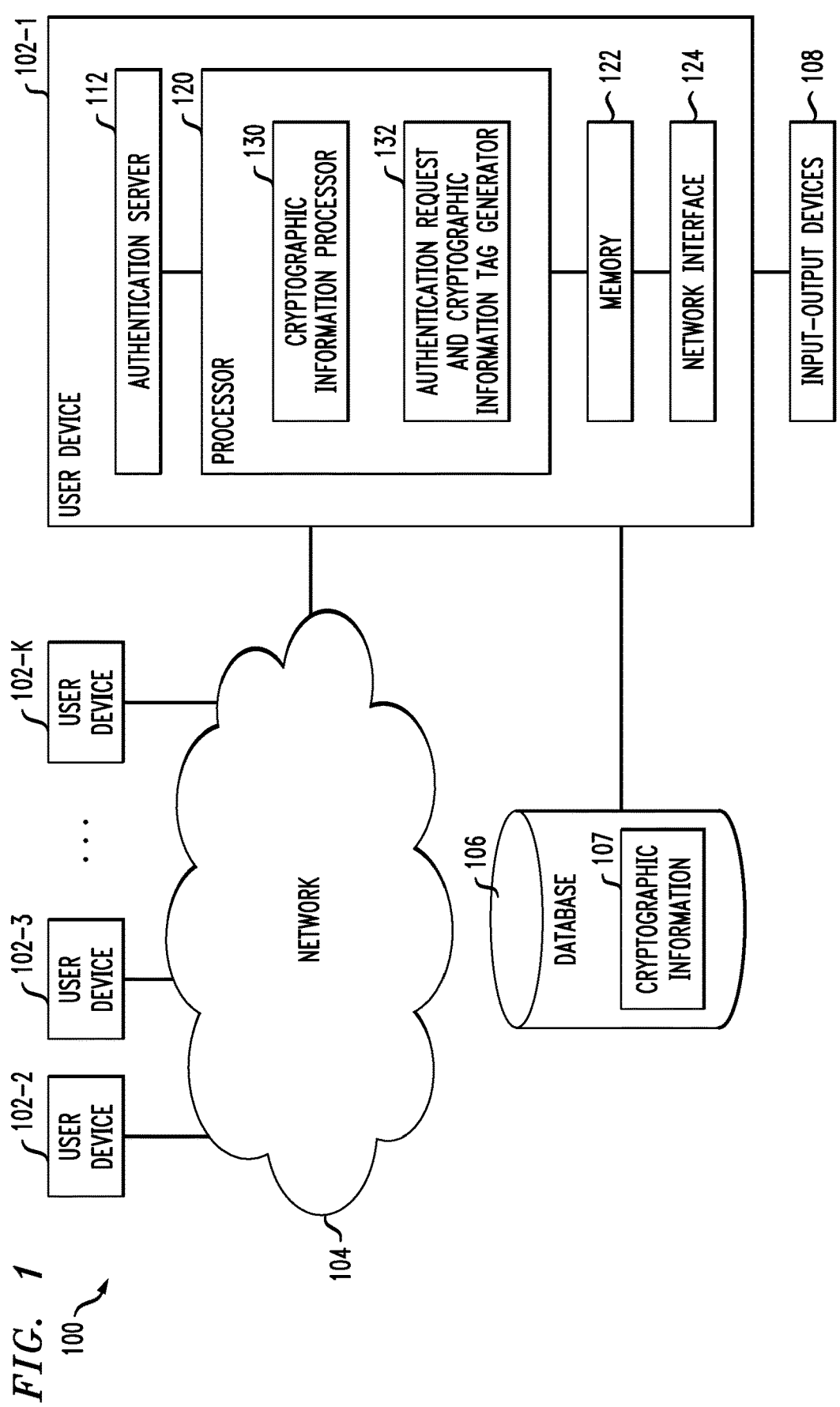
FIG. 1 shows an information processing system configured for user-controlled transaction tagging in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, 102-3, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the user devices 102 can have an associated database 106 configured to store data 107 pertaining to cryptographic information associated with authentication events, which may comprise, for example, authentication data or other types of login data including timestamps and other information associated with login events.

The database 106 in the present embodiment is implemented using one or more storage systems associated with user devices 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 are input-output devices 108, which illustratively comprise keyboards, displays or other types of input-output devices in any combination. Such input-output devices can be used, for example, to support one or more user interfaces to user devices 102, as well as to support communication between user devices 102 and other related systems and devices not explicitly shown.

Figure 2:
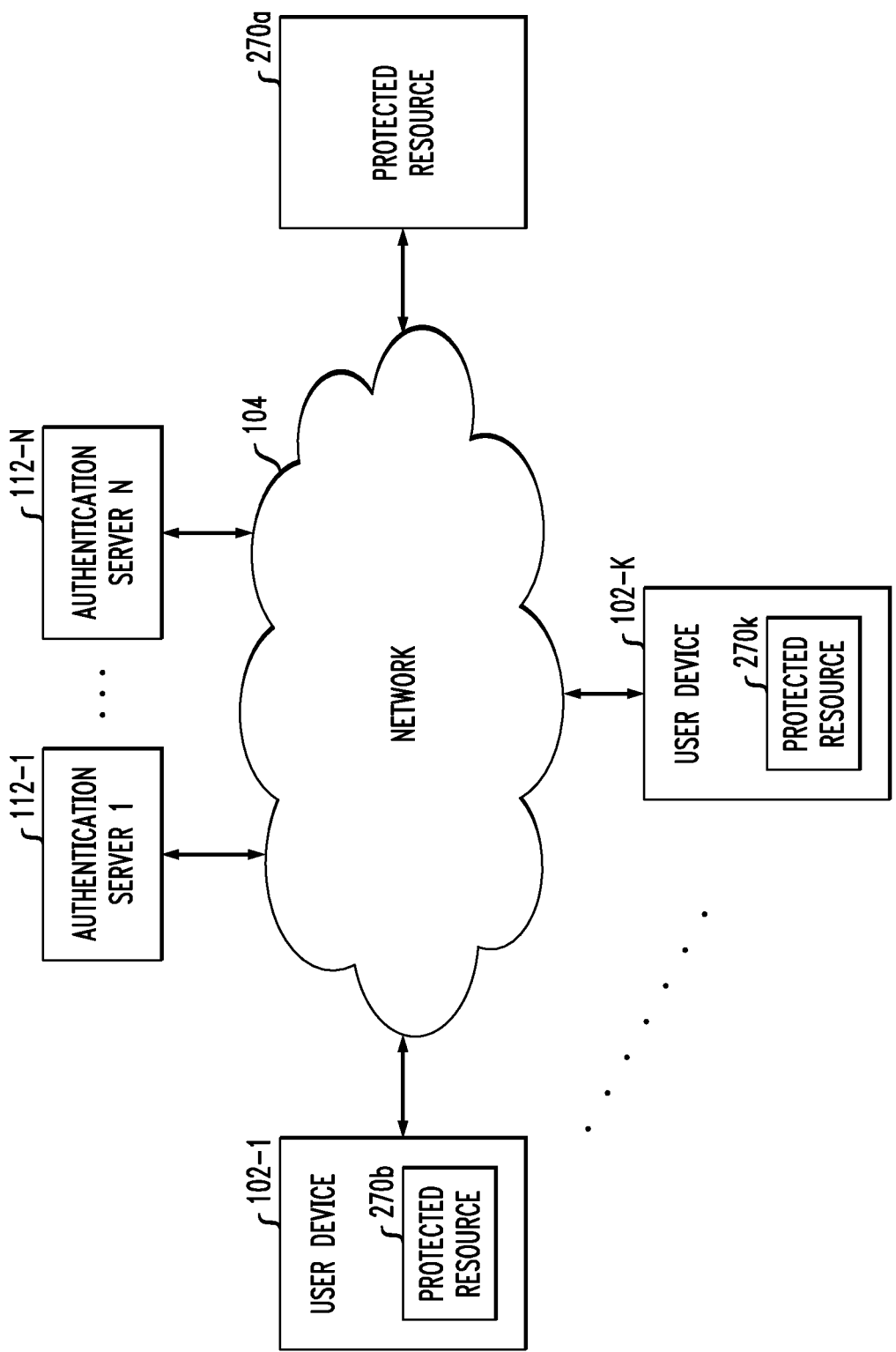
FIG. 2 shows another information processing system configured for user-controlled transaction tagging in an illustrative embodiment of the invention.

As also depicted in the example embodiment of the invention detailed in FIG. 1, user devices 102 comprise an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors (as further detailed herein). Upon verification of the presented authentication factors, the authentication server 112 grants the requesting user device 102 access to one or more protected resources of the computer network 100. Although shown as an element of the user devices 102 in this embodiment, the authentication server 112 in other embodiments can be implemented at least in part externally to the user device 102, for example, as a stand-alone server, set of servers or other type of authentication system coupled to the network 104 (such as depicted in FIG. 2, for example).

Each user device 102 in the FIG. 1 embodiment is assumed to be implemented using at least one processing device. Each such processing device generally comprises at least one processor and an associated memory, and implements one or more functional modules for controlling certain features of the user device 102.

More particularly, user devices 102 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the user devices 102 to communicate over the network 104 with the user devices 102, and illustratively comprises one or more conventional transceivers.

The processor 120 further comprises a cryptographic information processor 130 and an authentication request and cryptographic information tag generator 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof.

At least portions of the cryptographic information processor 130 and authentication request and cryptographic information tag generator 132 may be implemented at least in part in the form of software that is stored in memory 122 and executed by processor 120. Similarly, at least portions of the authentication server 112 of user devices 102 can be implemented at least in part in the form of software that is stored in memory 122 and executed by processor 120.

It is to be understood that the particular set of elements shown in FIG. 1 for user-controlled authentication transaction tagging involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

An exemplary process utilizing cryptographic information processor 130 and authentication request and cryptographic information tag generator 132 of an example user device 102 in computer network 100 will be described in more detail with reference to the flow diagram of FIG. 4.

FIG. 2 is a system diagram of an illustrative embodiment of the invention. By way of illustration, FIG. 2 depicts an alternative embodiment to FIG. 1, wherein the authentication server(s) 112 is/are not resident on the user device(s) 102, but rather are separate devices. Accordingly, as depicted in FIG. 2, user device 102 communicates with a protected resource 270a over network 104. As detailed further below, at least one embodiment of the invention can also include user device 102s that includes protected resource 270b . . . 270k residing thereon. In an example implementation, a user authenticates online with one or more authentication servers 112-1 through 112-N (hereinafter, collectively referred to as authentication servers 112) before obtaining access to protected resource 270a, 270b and/or 270k (hereinafter, collectively referred to as protected resource 270 unless otherwise specified).

According to one aspect of the invention, as noted above, the user of the user device 102 is authenticated by authentication servers 112 using a password, challenge questions, and/or other forms of cryptographic information. The exemplary communications among the system elements 102, 104 and 270 of FIG. 2 to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, challenge question, or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, web site or hardware device. In other words, a protected resource 270 is a resource that grants user access responsive to an authentication process, as will be described in greater detail below. For example, protected resource 270a may include an access controlled file, e-mail, a protected application, a remote application server such as a web site or other software program or hardware device that is accessed by the user device 102 over a network 104.

Additionally, in at least one embodiment of the invention, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access controlled file, e-mail, a protected application, a remote application server such as a web site or other software program or hardware device that is accessed by the user device 102 over network 104. Similarly, it is possible that in order to unlock the mobile platform to perform operations, a successful authentication might be required.

Accordingly, in scenarios wherein multiple devices are involved in the flow of a user gaining an access to a protected resource and/or performing a secure transaction, such a flow can begin with the user initiating an access to the protected resource/initiating the transaction on one device (DEVICE 1) and, in turn, being prompted to perform an authentication on another device(s) (DEVICE 2). In such a scenario, there is a need for the user to identify the request-for-authentication that he or she received on DEVICE 2. Such an identification enables the user to know, with certainty, the particular transaction/access request for which he or she is authenticating (as multiple such attempts/requests—legitimate and/or fraudulent—can be carried out and/or processed within a similar time frame).

At least one embodiment of the invention includes implementing a mechanism by which an end-user can tag and/or annotate a transaction so as to enable easier identification and co-relation of the subsequent associated authentication prompts presented to him or her. Such a mechanism, as further detailed herein, enables the user to easily correlate the authentication prompts with the transaction he or she is performing that require the user to authenticate in order to proceed. This type of correlation also enables easier identification of malicious authentication prompts.

By way of example, when a user initiates a transaction/access request, in addition to the data that the user typically enters (such as, for example, a username), the user will also enter or select a piece of data (text data, image data, video data, voice data etc.) to be used to tag the transaction. In one or more embodiments of the invention, such data can be randomly generated. This tag is retained until the transaction is completed, and the tag can be shown and/or presented to the user in all subsequent events related to the transaction/access request such as, for example, push (authentication) notifications on the user's mobile device (DEVICE 2) so that the user can easily identify and co-relate events. Additionally, because the tag data is entered and/or selected by the user, such data will be easier for the user to remember and recollect when identifying and co-relating any incoming authentication prompts.

Figure 3:
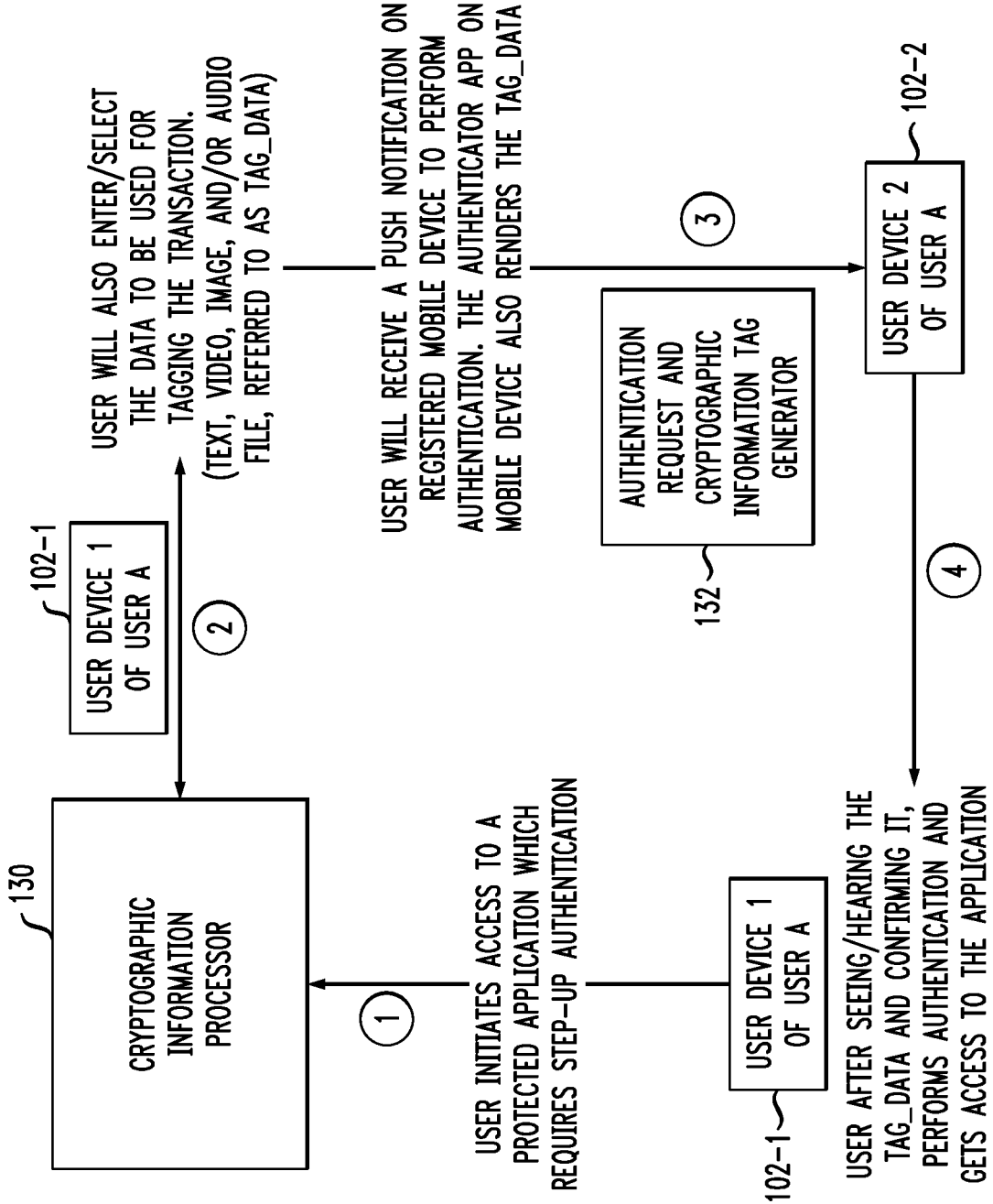
FIG. 3 shows an example workflow for user-controlled transaction tagging in an illustrative embodiment of the invention.

In connection with the example embodiment illustrated in FIG. 3, the following terms are relevant and/or applicable. For instance, a cloud-based authentication provider can be referred to as AUTH_PROVIDER. Additionally, assume that a user, who has a work-laptop (DEVICE 1) and a smart mobile device (DEVICE 2), has registered with AUTH_PROVIDER using the smart mobile device (DEVICE 2). Further, also assume that the user has installed an authenticator app (AUTH_APP) provided by the AUTH_PROVIDER as part of this registration. It can also be assumed that the user is part of an organization wherein the resources are protected with AUTH_PROVIDER, and to access each protected resource, the user needs to complete an authentication (determined by the AUTH_PROVIDER) on his or her mobile device (DEVICE 2).

Accordingly, FIG. 3 shows an example workflow for user-controlled transaction tagging in an illustrative embodiment of the invention. By way of illustration, in the FIG. 3 example embodiment, the user (USER A) attempts to access a protected resource from his or her work laptop 102-1 (DEVICE 1). To gain access to the resource, in this example, the user is required to perform a biometric authentication on his or her registered mobile device 102-2 (DEVICE 2).

As depicted in FIG. 3, the user enters (Step 1 in FIG. 3) cryptographic information such as username, etc. into the cryptographic information processor 130, and also enters and/or selects (Step 2 in FIG. 3) one or more additional items of data that will be used to tag the transaction (TAG_DATA). Such data can include text data, image data, video data, voice/audio data, etc. Accordingly, the user submits the input data (which includes TAG_DATA) to the server (AUTH_PROVIDER). In response to this submission, the AUTH_PROVIDER (via the authentication request and cryptographic information tag generator 132) sends (Step 3 in FIG. 3) the TAG_DATA (and/or its reference) along with the authentication push notification to the user' registered smart mobile device 102-2 (DEVICE 2). Such a reference can include, by way merely of example, a uniform resource locator (URL) of an image stored on the server, and can include data which occupies less space and can be used later to retrieve the TAG_DATA (which might include, for example, a user-uploaded image).

Referring again to FIG. 3, the authentication app (AUTH_APP) on the user's registered smart mobile device 102-2 will interpret the TAG_DATA (and/or its reference) and render such data accordingly to the user (via device 102-2). In a scenario wherein a reference to the TAG_DATA is sent in place of the actual TAG_DATA, the AUTH_APP will use the reference to pull the TAG_DATA before rendering the TAG_DATA. This can be achieved in multiple ways, such as, for example, fetching TAG_DATA from a URL sent as part of the reference.

Because it was the user who entered or selected the data used as the TAG_DATA, such data may plausibly be known only to him or her, and the user can easily identify that the authentication push request that he or she received corresponds to the particular transaction or access request in question. The TAG_DATA along with any existing information that is already being displayed (such as the user's username, time information, location information, etc.) on the user's mobile device 102-2, will enable the user to easily identify the particular transaction/access request with confidence, allowing the user to securely move forward (Step 4 in FIG. 3) with completing the authentication process.

In one or more embodiments of the invention, the user-generated and/or user-selected tagging data (TAG_DATA) can be random and unique on a per-transaction basis. Additionally, in at least one embodiment of the invention, such tagging data are not stored or persisted, further increasing the challenge for malicious users attempting to impersonate the actual user.

Additionally, one or more embodiments of the invention can include implementing the tag data mechanism in a variety of use cases and/or contexts, such as, for example, a voice OTP context (wherein an OTP is dictated over a voice call), an interactive voice response (IVR) context (further detailed below in connection with a loan example), an email-based verification/registration/OTP context, etc.

With respect to an IVR context, consider an example scenario wherein a user applies for a loan by completing a required form online, and in response thereto, the user is scheduled to receive a call back from the loan provider. Under conventional approaches, a challenge might exists here with respect to the user verifying that a subsequent call is indeed coming from the authentic loan provider (which the user will want to do before revealing any sensitive personal information or financial details). In accordance with one or more embodiments of the invention, however, the tag data mechanism can be applied wherein the user, after applying for the loan online, tags the transaction (in connection with the online form) with user-generated and/or user-selected data such as a voice/audio phrase. Accordingly, the same will be recited back (in an automated fashion) during the telephone conversation from the authentic loan provider, which will provide the user with confidence that he or she is indeed speaking with the authentic authority.

Figure 4:
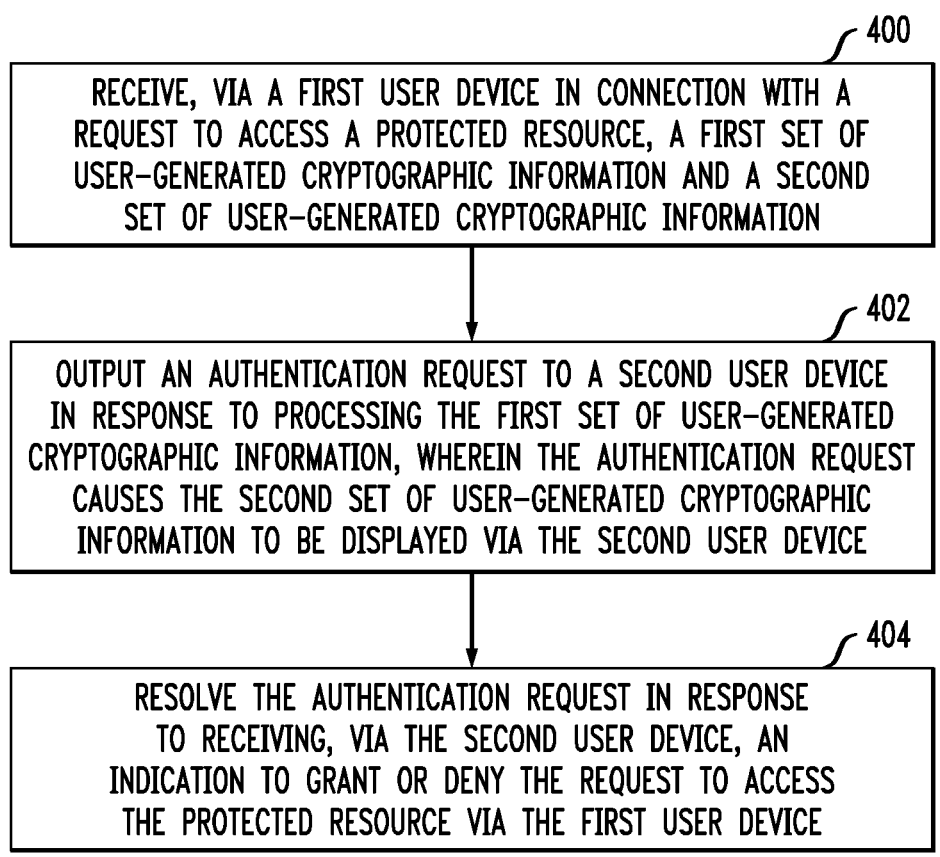
FIG. 4 is a flow diagram of a process for user-controlled transaction tagging in an illustrative embodiment.

FIG. 4 is a flow diagram of a process for user-controlled transaction tagging to enable easier identification and co-relation of subsequent related events in an illustrative embodiment. It is to be understood that this particular process is only an example, and additional or alternative processes can be carried out in other embodiments.

In this embodiment, the process includes steps 400 through 404. These steps are assumed to be performed by the processor 120 utilizing its modules 130 and 132.

Step 400 includes receiving, via a first user device in connection with a request to access a protected resource associated with the user, a first set of user-generated cryptographic information and a second set of user-generated cryptographic information. In at least one embodiment of the invention, the second set of user-generated cryptographic information is unique to the respective request to access the protected resource. Additionally, as used herein, "user-generated cryptographic information" indicates that at least a portion of the cryptographic information is user-generated. Similarly, as used herein, "user-selected cryptographic information" indicates that at least a portion of the cryptographic information is user-selected.

The first set of user-generated cryptographic information can include at least one of a user identifier and a password. The second set of user-generated cryptographic information can include a user-generated set of alphanumeric data, a user-selected set of alphanumeric data, a user-generated set of voice data, a user-selected set of voice data, a user-generated set of image data, a user-selected set of image data, a user-generated set of video data, and/or a user-selected set of video data.

Step 402 includes generating and outputting an authentication request to a second user device in response to processing the first set of user-generated cryptographic information against a stored set of cryptographic information associated with the protected resource, wherein the authentication request causes the second set of user-generated cryptographic information to be rendered via the second user device. As detailed herein, the first user device can include a desktop computer, a laptop computer, a tablet, and/or a mobile device. Additionally, the second user device can include a desktop computer, a laptop computer, a tablet, and/or a mobile device. Also, in one or more embodiments of the invention, the authentication request can request the user to perform any form of authentication applicable and as indicated by the authentication server (including biometric authentication, non-biometric authentication, etc.).

Step 404 includes resolving the authentication request in response to receiving, via the second user device, an indication to grant or deny the request to access the protected resource via the first user device. In at least one embodiment of the invention, the indication can include a biometric input and/or a non-biometric input.

Accordingly, the particular processing operations and other functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches.

For example, some embodiments are configured to enable the user himself or herself to tag a transaction with a random piece of data for use is a subsequent authentication. These and other embodiments can effectively securely facilitate identification and co-relation of subsequent associated events such as mobile push notifications for authentications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
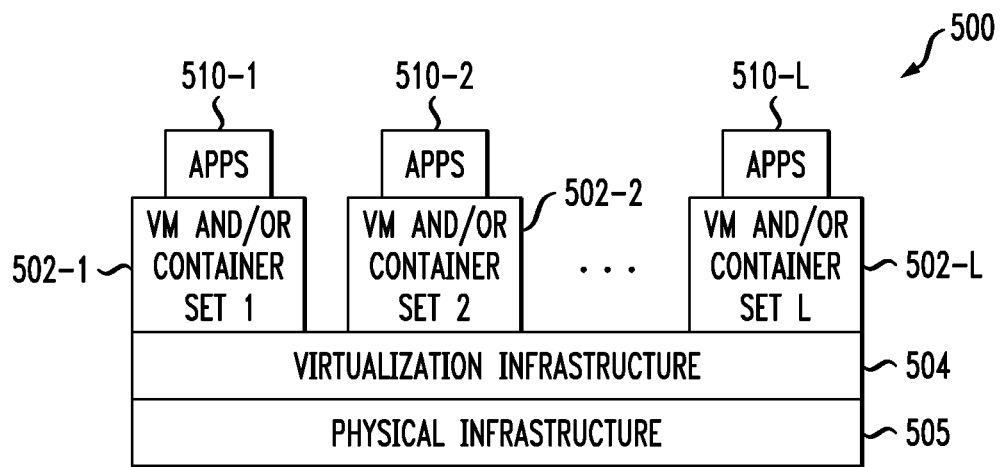
FIGS. 5 and 6 show examples of processing platforms that may be utilized to implement at least a portion of an information processing system in illustrative embodiments.
Figure 6:
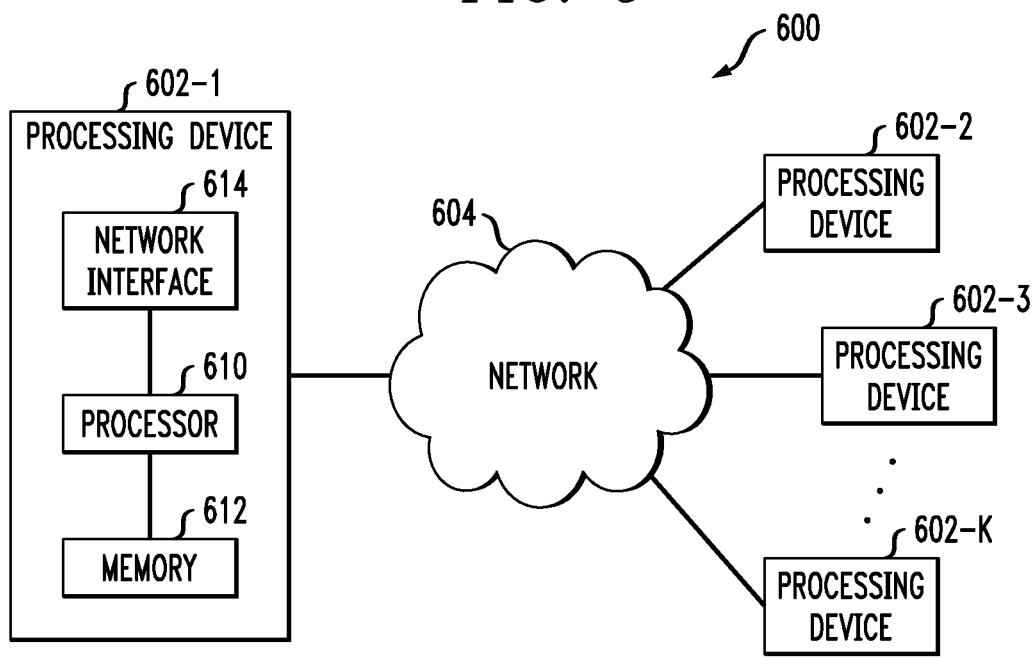

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure authentication processes involving multiple user devices. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
receiving, via a first user device in connection with a request to access a protected resource associated with the user, a first set of user-generated cryptographic information and a second set of user-generated cryptographic information, wherein the second set of user-generated cryptographic information comprises at least a set of user-uploaded voice data and a user-uploaded image, and wherein the second set of user-generated cryptographic information is unique exclusively to the respective request to access the protected resource;
generating and outputting, by a server, an authentication request and (ii) a reference to the second set of user-generated cryptographic information to a second user device in response to processing the first set of user-generated cryptographic information against a stored set of cryptographic information associated with the protected resource, wherein the reference to the second set of user-generated cryptographic information comprises at least one uniform resource locator of the user-uploaded image and the set of user-uploaded voice data stored on the server;
resolving the authentication request in response to receiving a response from the user via the second user device, wherein the response comprises an indication, based at least in part on the user-uploaded image and the set of user-uploaded voice data stored on the server, to grant or deny the request to access the protected resource via the first user device; and
precluding storage of the second set of user-generated cryptographic information subsequent to resolving the authentication request;
wherein the method is performed by at least one processing device comprising a processor coupled to a memory.

2. The computer-implemented method of claim 1, wherein the first set of user-generated cryptographic information comprises at least one of a user identifier and a password.

3. The computer-implemented method of claim 1, wherein the second set of user-generated cryptographic information comprises a user-generated set of alphanumeric data.

4. The computer-implemented method of claim 1, wherein the second set of user-generated cryptographic information comprises a user-selected set of alphanumeric data.

5. The computer-implemented method of claim 1, wherein the second set of user-generated cryptographic information comprises a user-generated set of voice data.

6. The computer-implemented method of claim 1, wherein the second set of user-generated cryptographic information comprises a user-generated set of image data.

7. The computer-implemented method of claim 1, wherein the second set of user-generated cryptographic information comprises a user-selected set of image data.

8. The computer-implemented method of claim 1, wherein the second set of user-generated cryptographic information comprises a user-generated set of video data.

9. The computer-implemented method of claim 1, wherein the second set of user-generated cryptographic information comprises a user-selected set of video data.

10. The computer-implemented method of claim 1, wherein the response from the user comprises at least one of (i) a biometric input submitted by the user via the second user device and (ii) a non-biometric input submitted by the user via the second user device.

11. A non-transitory computer-readable storage medium having stored therein program code of one or more software programs, wherein the program code when executed by at least one processing device causes the at least one processing device:
to receive, via a first user device in connection with a request to access a protected resource associated with the user, a first set of user-generated cryptographic information and a second set of user-generated cryptographic information, wherein the second set of user-generated cryptographic information comprises at least a set of user-uploaded voice data and a user-uploaded image, and wherein the second set of user-generated cryptographic information is unique exclusively to the respective request to access the protected resource;
to generate and output, by a server, (i) an authentication request and (ii) a reference to the second set of user-generated cryptographic information to a second user device in response to processing the first set of user-generated cryptographic information against a stored set of cryptographic information associated with the protected resource, wherein the reference to the second set of user-generated cryptographic information comprises at least one uniform resource locator of the user-uploaded image and the set of user-uploaded voice data stored on the server;
to resolve the authentication request in response to receiving a response from the user via the second user device, wherein the response comprises an indication, based at least in part on the user-uploaded image and the set of user-uploaded voice data stored on the server, to grant or deny the request to access the protected resource via the first user device; and
to preclude storage of the second set of user-generated cryptographic information subsequent to resolving the authentication request.

12. The non-transitory processor-readable storage medium of claim 11, wherein the second set of user-generated cryptographic information comprises at least one of a user-generated set of alphanumeric data, a user-generated set of voice data, a user-generated set of image data, and a user-generated set of video data.

13. The non-transitory processor-readable storage medium of claim 11, wherein the second set of user-generated cryptographic information comprises at least one of a user-selected set of alphanumeric data, a user-selected set of image data, and a user-selected set of video data.

14. The non-transitory processor-readable storage medium of claim 11, wherein the response from the user comprises at least one of (i) a biometric input submitted by the user via the second user device and (ii) a non-biometric input submitted by the user via the second user device.

15. The non-transitory processor-readable storage medium of claim 11, wherein the first set of user-generated cryptographic information comprises at least one of a user identifier and a password.

16. An apparatus comprising:
at least one processing device comprising a processor coupled to a memory;
the at least one processing device being configured:
to receive, via a first user device in connection with a request to access a protected resource associated with the user, a first set of user-generated cryptographic information and a second set of user-generated cryptographic information, wherein the second set of user-generated cryptographic information comprises at least a set of user-uploaded voice data and a user-uploaded image, and wherein the second set of user-generated cryptographic information is unique exclusively to the respective request to access the protected resource;

to generate and output, by a server, (i) an authentication request and (ii) a reference to the second set of user-generated cryptographic information to a second user device in response to processing the first set of user-generated cryptographic information against a stored set of cryptographic information associated with the protected resource, wherein the reference to the second set of user-generated cryptographic information comprises at least one uniform resource locator of the user-uploaded image and the set of user-uploaded voice data stored on the server;

to resolve the authentication request in response to receiving a response from the user via the second user device, wherein the response comprises an indication, based at least in part on the user-uploaded image and the set of user-uploaded voice data stored on the server, to grant or deny the request to access the protected resource via the first user device; and to preclude storage of the second set of user-generated cryptographic information subsequent to resolving the authentication request.

17. The apparatus of claim 16, wherein the second set of user-generated cryptographic information comprises at least one of a user-generated set of alphanumeric data, a user-generated set of voice data, a user-generated set of image data, and a user-generated set of video data.

18. The apparatus of claim 16, wherein the second set of user-generated cryptographic information comprises at least one of a user-selected set of alphanumeric data, a user-selected set of image data, and a user-selected set of video data.

19. The apparatus of claim 16, wherein the response from the user comprises at least one of (i) a biometric input submitted by the user via the second user device and (ii) a non-biometric input submitted by the user via the second user device.

20. The apparatus of claim 16, wherein the first set of user-generated cryptographic information comprises at least one of a user identifier and a password.

* * * * *